United States Patent
Lansel

(10) Patent No.: US 9,383,548 B2
(45) Date of Patent: Jul. 5, 2016

(54) IMAGE SENSOR FOR DEPTH ESTIMATION

(71) Applicant: Olympus Corporation, Tokyo (JP)

(72) Inventor: Steven Lansel, E. Palo Alto, CA (US)

(73) Assignee: OLYMPUS CORPORATION, Tokyo (JP)

(*) Notice: Subject to any disclaimer, the term of this patent is extended or adjusted under 35 U.S.C. 154(b) by 50 days.

(21) Appl. No.: 14/302,349

(22) Filed: Jun. 11, 2014

(65) Prior Publication Data

US 2015/0362698 A1    Dec. 17, 2015

(51) Int. Cl.
   G02B 13/00   (2006.01)
   G06T 7/20    (2006.01)
   H04N 5/225   (2006.01)

(52) U.S. Cl.
   CPC .............. *G02B 13/0015* (2013.01); *G06T 7/20* (2013.01); *H04N 5/2254* (2013.01)

(58) Field of Classification Search
   CPC ..... G02B 13/0015; G06T 7/20; H04N 5/2254
   See application file for complete search history.

(56) References Cited

U.S. PATENT DOCUMENTS

| 3,971,065 | A | 7/1976 | Bayer |
| 7,068,432 | B2* | 6/2006 | Boettiger ............. G02B 3/0018 216/26 |
| 7,522,341 | B2* | 4/2009 | Mouli .................. G02B 3/0018 359/619 |
| 8,619,177 | B2* | 12/2013 | Perwass ............. H04N 13/0232 348/222.1 |
| 2007/0269127 | A1 | 11/2007 | Kusaka |
| 2012/0033120 | A1 | 2/2012 | Nakamura et al. |
| 2012/0281206 | A1* | 11/2012 | Ko ........................ G01S 17/89 356/218 |
| 2012/0307116 | A1 | 12/2012 | Lansel et al. |

FOREIGN PATENT DOCUMENTS

| JP | 2005-175392 | 6/2005 |
| JP | 2007-103590 | 4/2007 |
| JP | 2013-157780 | 8/2013 |
| JP | 2014-072541 | 4/2014 |
| JP | 2014-102262 | 6/2014 |

OTHER PUBLICATIONS

Butler, R., "Exclusive: Fujifilm's phase detection system explained," DPReview, Aug. 5, 2010, published online at: http://www.dpreview.com/news/2010/8/5/fujifilmpd; last viewed Sep. 18, 2014.

(Continued)

*Primary Examiner* — Twyler Haskins
*Assistant Examiner* — Padma Haliyur

(57) ABSTRACT

An apparatus for acquiring intensity and depth information images may comprise: an image sensing unit having first radiation-sensitive elements and groups of second radiation-sensitive elements in a flat or curved plane having at least two directions, the first radiation-sensitive elements and groups of second radiation-sensitive elements to receive, respectively, an intensity image and a depth information image, at least two groups of second elements extending in each of the two directions of the plane; first micro-lenses, each of which is arranged to convey radiation to a corresponding one of the first elements; and second micro-lenses, each of which is arranged to convey radiation to a corresponding group of the second elements.

22 Claims, 12 Drawing Sheets

(56) References Cited

OTHER PUBLICATIONS

Author Unknown, "Dual Pixel CMOS AF," published online at: http://www.usa.canon.com/cusa/consumer/standard/display/daf_technology; last viewed Sep. 18, 2014.

Ferstl, D., et al,, "Image Guided Depths Upsampling using Anisotropic Total Generalized Variation," International Conference on Computer Vision (ICCV), IEEE 2013, pp. 993-1000.

International Search Report and Written Opinion for Corresponding Application Serial No. PCT/JP2015/067105, Jul. 28, 2015, pp. 1-9.

* cited by examiner

IMAGE SENSOR FOR DEPTH ESTIMATION

FIELD OF THE INVENTION

Embodiments of the present disclosure relate generally to imaging systems for both measuring depth and collecting optical intensity images.

BACKGROUND

Imaging systems in the field of the invention generally rely on the basic principle of triangulation. The most basic implementation of this principle involves images from only two locations where the effective aperture for the pixels in the two images is small relative to the separation between the two points. (Herein the effective aperture is considered to be the portion of the physical aperture that contains all of the rays that reach the active part of the sensing pixel.) This implementation with two images from different locations is called stereo vision and is often implemented with two separate cameras and lenses. To perform triangulation, a correspondence problem for the images from different locations needs to be solved to determine the location of an object in both images. The location within the images determines a direction from the positions of the cameras to the object. The intersection of these two lines determines the object's location in a scene, which gives the depth of the object. (The depth of an object in the scene is the distance from the imaging system to the object, and the scene is the part of the three dimensional world outside the camera that is visible to the camera. Typically the camera captures a two dimensional representation—an image—of the three dimensional scene.) In other words, the disparity, which is the shift in the object's position between the two images, is used to determine the depth of the object.

When the geometry of the imaging system is known, only certain matches should be considered which are referred to as feasible matches. These matches are the ones where the associated lines into the scene from the camera's locations intersect each other. For an imaging system with two cameras or view images, this means that for a given region in a first image the set of possible matches in the second image lie along a straight line through the second image. Solving the correspondence problem accurately requires the region in the first image to only accurately resemble a region centered at a single point along this line of possible matches.

Because of the geometry of triangulation, the disparity increases with a larger distance between the locations of the views, called the baseline. For imaging systems, the disparity is inherently measured in units of pixels in an image. A disparity of one pixel between two images from different viewpoints may be considered the minimum disparity necessary to reliably estimate depth from the two images. Therefore, depth accuracy increases as the baseline increases. However, for baselines larger than the diameter of a single lens, this principle may not be true because the scene appears different from different locations in a manner that cannot be approximated by local translations of objects. For example, near occlusions objects may be visible in only one image. However this effect is negligible for monocular imaging systems due to the limited baseline imposed by the dimensions of the lens relative to the distance to objects in the scene.

Since every pixel in a traditional camera has an effective aperture equal to the physical aperture of the camera, disparity cannot be observed using traditional cameras. FIG. 1 shows an example of such a basic camera setup, including an optical axis 100, a main lens 101, a micro-lens array 102 and an image sensing unit 103.

Imaging systems in the general field of the invention compare different view images to determine the disparity and in turn estimate the depth of an object. Some approaches use a small percent of pixels to obtain at a few locations two view images where the effective aperture is half of the physical aperture, typically the left and right halves of the aperture. For simplicity of description consider only the design that uses the left and right halves, which is functionally equivalent to the use of the top and bottom halves. These depth sensing pixels are often placed adjacent to each other in a section of a few rows of the sensor so that within any local region of the sensor all of the depth sensing pixels occupy a single row. Therefore, the depth may only be estimated at a small number of locations of the scene. Potentially knowing the depth at a small number of locations is sufficient for autofocus detection, which is the intended use of these pixels. However it is insufficient for many applications where an entire depth image is needed.

The effective apertures of the depth sensing pixels in these sensors is generally implemented by one of two designs. The first design includes placing the depth sensing pixels behind micro-lenses that are horizontally approximately twice as wide as the pixel pitch. Generally all of the light that falls on the micro-lens from the left or right halves of the physical aperture is directed to the appropriate pixel behind the micro-lens. The second design includes a light mask so that the light falling on the pixel from the undesired part of the physical aperture is either blocked before reaching the pixel or not measured by the pixel. Although the two designs achieve nearly equivalent effective apertures, there are a few differences. The light mask blocks light which reduces the signal to noise ratio of the resultant measurements. Light masks can be built for a single pixel whereas the micro-lens must apply to two adjacent pixels to achieve complementary effective apertures.

These designs that only acquire two view images do not offer robust depth estimation. Consider part of a scene that contains a flat surface with the primary feature of a horizontal line. For example a uniformly colored part plane with a horizontal line viewed by such an imaging system. It is impossible to accurately solve the correspondence problem for this scene. Image regions near the horizontal line in the scene accurately match all similar regions in the other image. Since the imaging system only offers a horizontal change in viewpoint due to the horizontal baseline between the two effective apertures and the scene contains only a horizontal feature, the depth is impossible to accurately estimate. This problem applies not only to lines in the scene that are parallel to the baseline but also to the component of any line in the scene that is parallel to the baseline. The inability of the imaging system to use this clearly defined feature in the scene reduces the accuracy of any subsequent depth estimation.

An alternate design is to have all or nearly all pixels of the sensor have an effective aperture of the left or right half of the physical aperture, such as described above. This design overcomes the challenge of the previously described approach of only being able to estimate depth at a small number of locations in the scene. However, such sensors with all or nearly all pixels as depth sensing pixels suffer a significant loss in spatial resolution. They can only output optical intensity images with half of the total pixels that exist in the sensor because each output pixel is the average of two sensor pixels. By averaging pixels with left and right half effective apertures, a traditional pixel (herein a traditional pixel is a pixel with an effective aperture approximately centered at the center of the physical aperture) with a complete effective aperture is simulated. The significant loss of spatial resolution is a serious limitation of this design.

There is a need for systems and methods of depth estimation that can provide accurate depth estimation over a wide area of the scene, without sacrificing spatial imaging resolution.

SUMMARY OF THE INVENTION

An apparatus for acquiring intensity and depth information images may comprise: an image sensing unit having first radiation-sensitive elements (sensing pixels) and groups of second radiation-sensitive elements in a flat or curved plane having at least two directions, the first radiation-sensitive elements and groups of second radiation-sensitive elements to receive, respectively, an intensity image and a depth information image, at least two groups of second elements extending in each of the two directions of the plane; first micro-lenses, each of which is arranged to convey radiation to a corresponding one of the first elements; and second micro-lenses, each of which is arranged to convey radiation to a corresponding group of the second elements.

A method of simultaneously generating a depth image and a light intensity image may comprise: collecting light intensity data from an image sensing unit, the image sensing unit having: first radiation-sensitive elements and groups of second radiation-sensitive elements in a flat or curved plane having at least two directions, the first radiation-sensitive elements and groups of second radiation-sensitive elements to receive, respectively, an intensity image and a depth information image, at least two groups of second elements extending in each of the two directions of the plane; first micro-lenses, each of which is arranged to convey radiation to a corresponding one of the first elements; and second micro-lenses, each of which is arranged to convey radiation to a corresponding group of the second elements; processing using a computer processor the light intensity from the first radiation-sensitive elements to generate a light intensity image; processing using the computer processor the light intensity from the second radiation-sensitive elements to generate a depth image; and storing in a memory device the light intensity image and the depth image.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Figure 1:
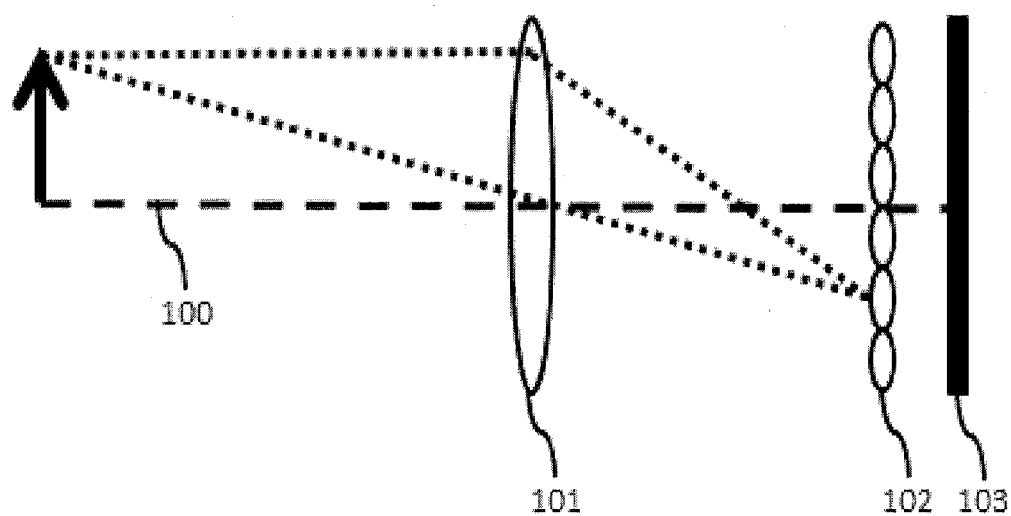
FIG. 1 is an example of a basic prior art camera configuration.

Embodiments of the present disclosure will now be described in detail with reference to the drawings, which are provided as illustrative examples of the disclosure so as to enable those skilled in the art to practice the disclosure. The drawings provided herein include representations of devices and device process flows which are not drawn to scale. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The present disclosure describes an imaging system that in some embodiments can generate both depth images and optical intensity images from a single exposure using a passive monocular camera. The imaging system may comprise a single main lens, a micro-lens array, and processing units that in a single exposure can output a full resolution optical intensity image and a depth image of a scene. The micro-lens array may in some embodiments comprise a regular repeating pattern of two types of circular micro-lenses: larger micro-lenses with micro-lens pitch approximately equal to twice the sensor's pixel pitch and smaller micro-lenses with a micro-lens pitch approximately equal to the sensor's pixel pitch. The pixels behind the larger micro-lenses are depth sensing pixels and are primarily used to generate the depth image. The pixels behind the smaller micro-lenses are traditional pixels and are primarily used to generate the full resolution optical intensity image.

There are a variety of ways to acquire depth images of a scene. Active methods send light from imaging equipment into the scene and measure the response. Since active methods have significant power requirements and require special illumination equipment, the systems of the present disclosure are configured to employ passive methods that do not emit any light but analyze the ambient light from a scene. However, the teaching and principles of the present disclosure may be utilized with active methods.

A number of passive depth estimation techniques, including stereo vision and camera arrays, require multiple cameras placed in different positions to infer depth. One disadvantage of using multiple cameras is the increased cost and power requirements. Multiple cameras also require careful position and spectral calibration as well as placement in multiple positions. The monocular cameras utilized in embodiments described herein require less equipment so may be cheaper and more compact than multiple camera systems and also may require little or no calibration.

Some imaging systems can measure depth images through multiple exposures including video recording. Techniques include when the camera is moved through different positions or the camera acquires multiple images each with different focal settings. These systems are limited to scenes that are static since any movement within the scene interferes with depth estimation. In some embodiments of the systems disclosed herein only a single exposure is required, consequently the generation of depth images involves less data processing and is more robust for dynamic scenes.

According to embodiments an imaging system may comprise a single main lens, a micro-lens array, and processing units that in a single exposure can output a full resolution optical intensity image and a depth image of a scene. The micro-lens array consists of a regular repeating pattern of two types of circular micro-lenses: larger micro-lenses with micro-lens pitch approximately equal to twice the sensor's pixel pitch-and-smaller micro-lenses with micro-lens pitch approximately equal to the sensor's pixel pitch. The pixels behind the larger micro-lenses are depth sensing pixels and are primarily used to generate the depth image. The pixels behind the smaller micro-lenses are traditional pixels and are primarily used to generate the full resolution optical intensity image. An example of a micro-lens arrangement is shown in FIG. 2.

Figure 2:
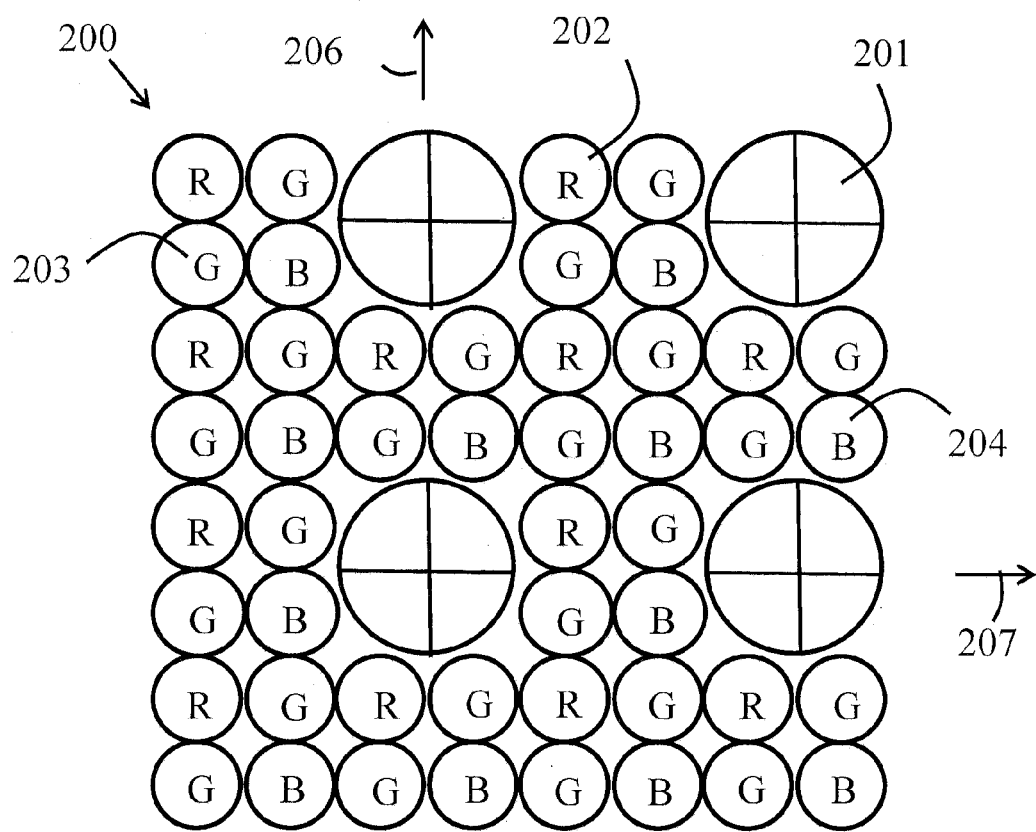
FIG. 2 is a schematic plan view of a detail of an array of micro-lenses comprising both traditional and depth sensing micro-lenses, according to some embodiments.
Figure 3:
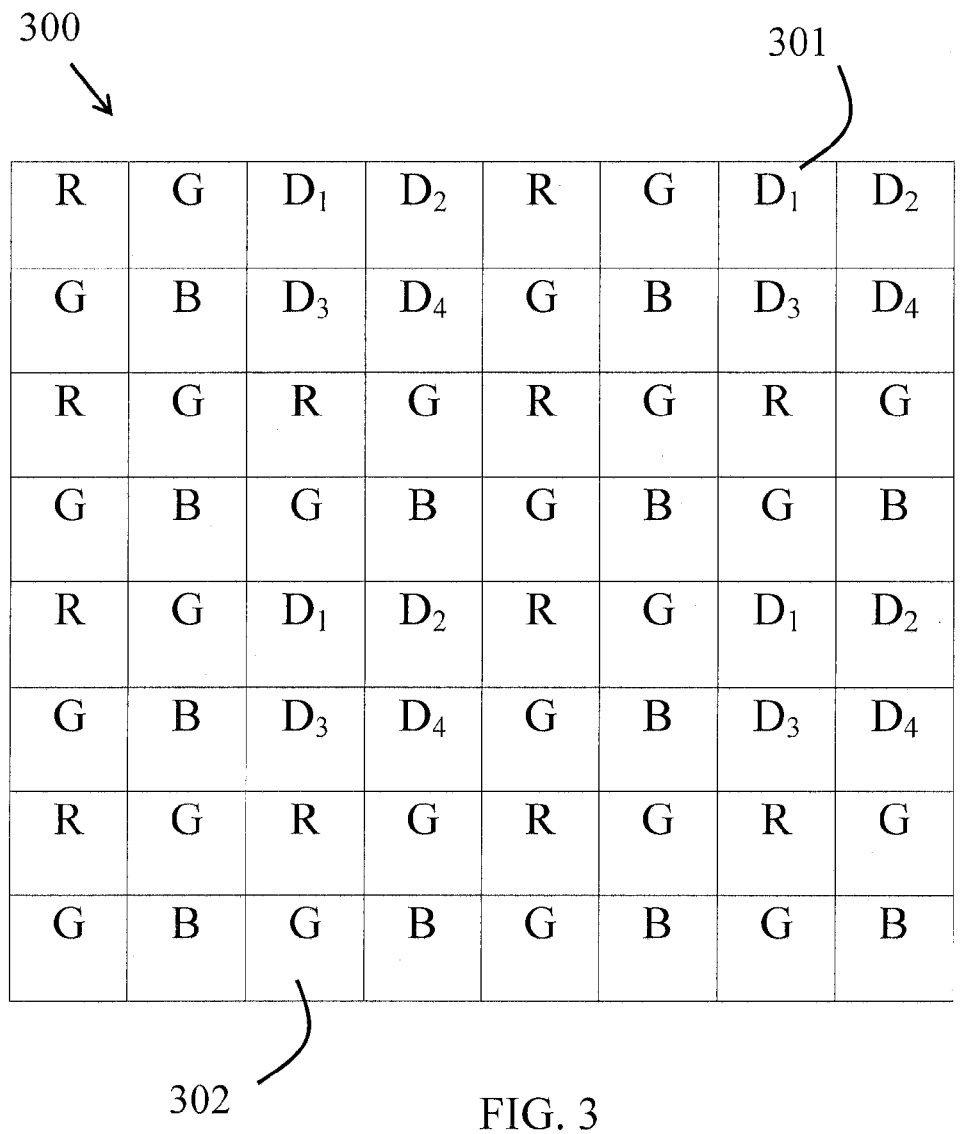
FIG. 3 is a schematic plan view of a detail of an array of pixels corresponding to the micro-lens array of FIG. 2, according to some embodiments.

FIG. 2 shows an array of micro-lenses 200 comprising larger depth sensing micro-lenses 201 and traditional micro-lenses 202-204, the latter being labeled with R, G and B, respectively, to indicate the color that is detected by the sensing pixel associated with each micro-lens. Directions 206 and 207, which in this example are orthogonal, indicate the directions in the plane of the array along which the depth sensing micro-lenses are arranged. Red, green and blue light may be provided by a color filter array (not shown in FIG. 2) integrated with the sensor. FIG. 3 shows an array of sensor pixels 300 (where each pixel may be a photodiode, for example) which corresponds with the array of micro-lenses in FIG. 2. In FIG. 3 the array 300 comprises RGB sensors 302, where the color sensitivity is labeled in the figure, and the color sensitivity may be determined by a color filter array (described in more detail below), and depth sensing pixels 301 which are labelled "$D_x$" where x=1, 2, 3, 4 in the figure. The depth sensing pixels are arranged in groups of four—one depth sensing pixel 301 per quadrant of each large depth sensing micro-lens 201. However, further embodiments may be arranged in different configurations; for example, with the rectangular array of sensing pixels there may be 9 depth sensing pixels per depth sensing micro-lens; furthermore, when sensing pixels are arranged in a hexagonal close-packed (HCP) configuration, there may be 3 or 7 or more depth sensing pixels per depth sensing micro-lens. For example, see FIGS. 14 and 15, described in more detail below. Yet furthermore, other array arrangements and lens shapes may be used as per the teaching and principles of the present disclosure.

Figures 4A, 4B, 5:
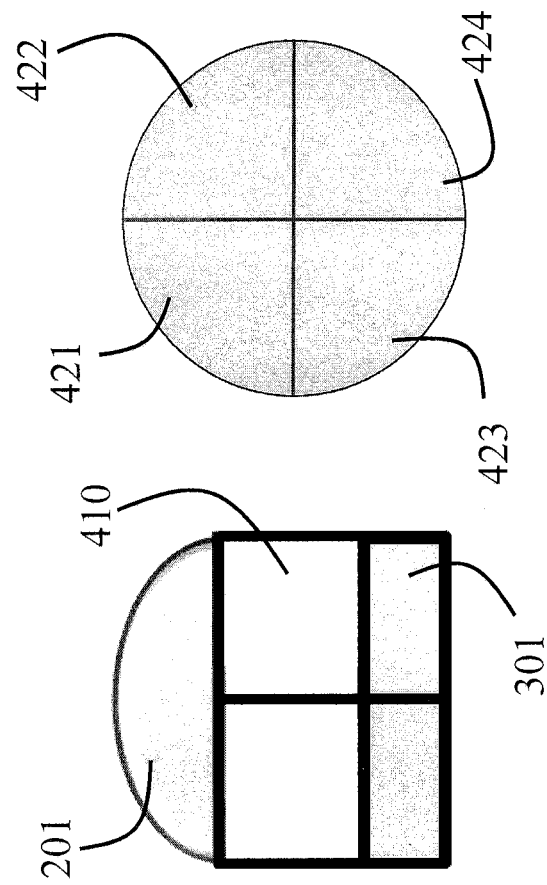
FIGS. 4A & 4B are top view and side view, respectively, of a first embodiment of depth sensing pixels.
FIG. 5 is a representation of the effective apertures of the depth sensing pixels of FIGS. 4A & 4B.
Figure 11:
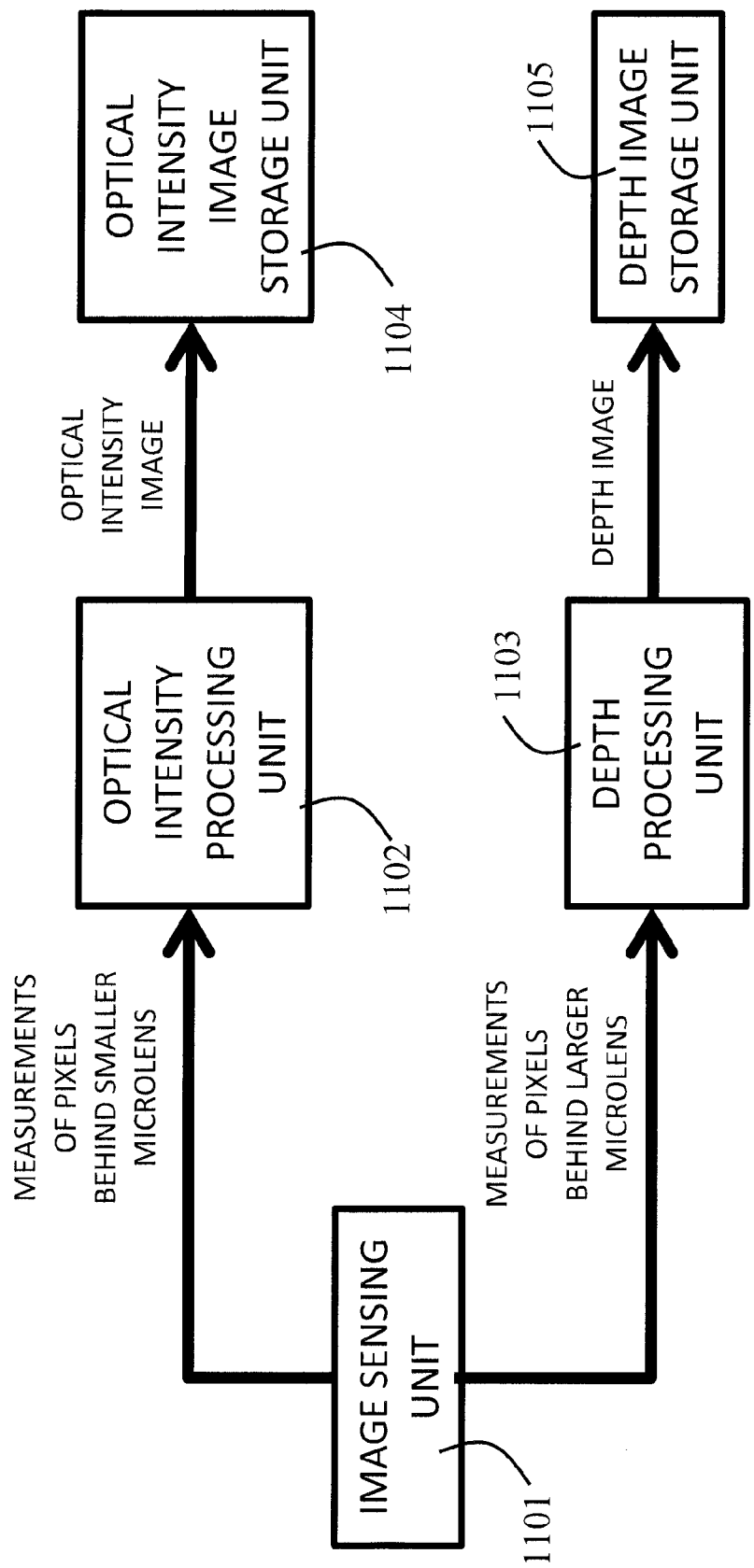
FIG. 11 is a schematic diagram of a first embodiment of an image acquisition system including depth estimation, according to some embodiments.
Figure 12:
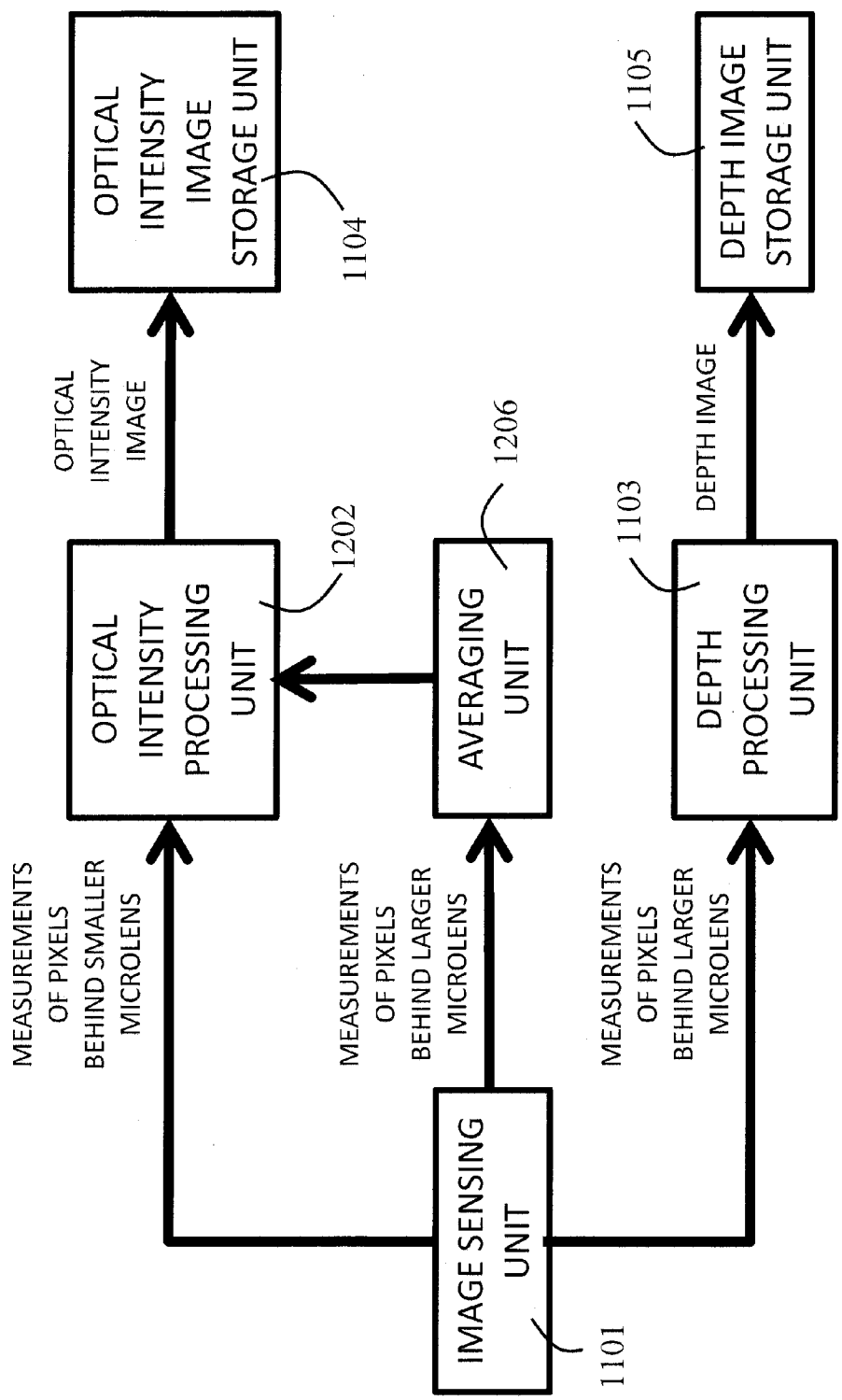
FIG. 12 is a schematic diagram of a second embodiment of an image acquisition system including depth estimation, according to some embodiments.
Figure 13:
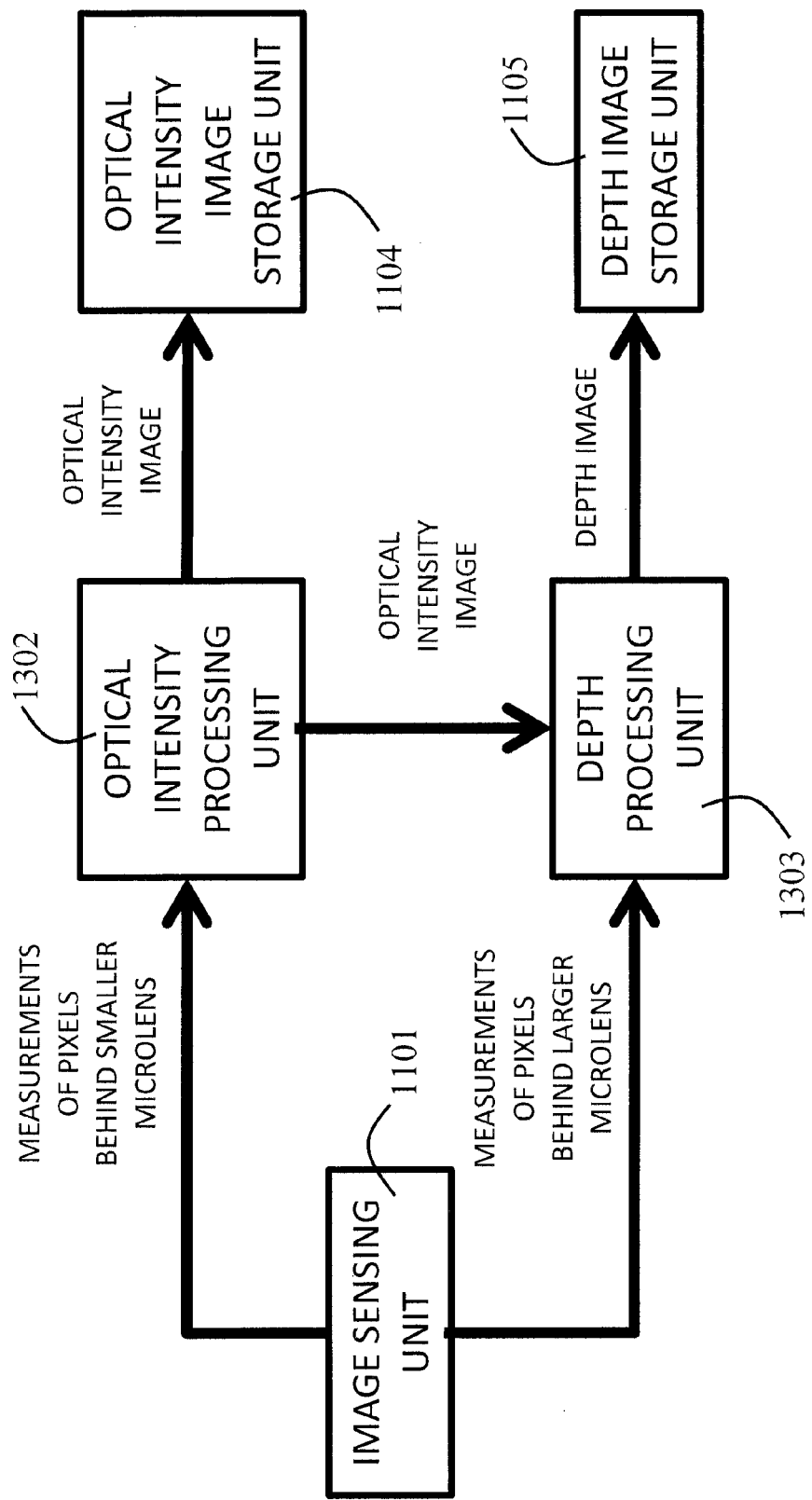
FIG. 13 is a schematic diagram of a third embodiment of an image acquisition system including depth estimation, according to some embodiments.

FIGS. 4A & 4B show more detailed top and side views of a large depth sensing micro-lens 201 and corresponding depth sensing pixel photodiodes 301. The structure 410 is the part of the image sensor between the photodiodes 301 and the micro-lenses 201—structure 410 contains the color filter array and also acts as a spacer to allow light from the micro-lenses to be focused on the photodiodes. FIG. 5 is a representation of the effective apertures 421-424 for the four sensing pixels 301 ($D_4$, $D_3$, $D_2$, $D_1$, respectively) which correspond approximately to the four quadrants of the depth sensing micro-lens 201. The micro-lens arrangement of FIG. 2 and the corresponding sensor array of FIG. 3 may be configured in a monocular imaging system in the same arrangement as shown in FIG. 1. As shown in FIGS. 11-13, and described in more detail below, the sensor array is connected to image processing units and image storage units for manipulation and storage of the intensity images generated by the sensor array. (Image processing units and image storage units may comprise computer processors and memory devices.)

Technical requirements of the micro-lens arrangement for obtaining depth images and red, green and blue (RGB) images according to certain embodiments are summarized below.

First, large depth sensing micro-lenses are surrounded by small traditional micro-lenses—this could be interpreted as the pixels behind large depth sensing micro-lenses are not adjacent to pixels behind any other large micro-lens. This requirement may be necessary to obtain accurate RGB values at large micro-lens locations with the best validity, although it is not necessary when lower validity will suffice. Furthermore, in some embodiments the large micro-lenses may be adjacent along a diagonal of the square array of micro-lenses.

Second, large depth sensing micro-lenses need to be positioned throughout the image sensor array. For example, in embodiments every region of the sensor array of size 6×6 pixels should contain at least one large depth sensing micro-lens, in further embodiments every region of the sensor array of size 8×8 pixels should contain at least one large depth sensing micro-lens, and in yet further embodiments every region of the sensor array of size 10×10 pixels should contain at least one large depth sensing micro-lens. As a further example, and as shown in FIG. 2, in embodiments the requirement may be that any group of 4×4 pixels contains at least 4 depth sensing pixels; further, in some embodiments the requirement may be that any group of 6×6 pixels contains at least 4 depth sensing pixels; and furthermore, in certain embodiments the requirement may be that any group of 8×8 pixels contains at least 4 depth sensing pixels. More generally, in some embodiments the ratio of traditional pixels to groups of depth sensing pixels (where the group is 3 or more pixels, as described above) is between 6 to 1 and 100 to 1. In other embodiments the ratio is between 20 to 1 and 40 to 1 and in yet other embodiments the ratio is 32. If there are no large micro-lenses in a region of the sensor, no depth estimate can be obtained there. This requirement is necessary to obtain a depth image but is not necessary for autofocus (AF) since AF only requires depth at a small number of disjoint locations in an image.

Third, from each large depth sensing micro-lens, there must be at least two large depth sensing micro-lenses nearby within about 6 pixels such that the nearby large micro-lenses are not collinear. The distance between large depth sensing micro-lenses determines the precision of the depth estimation. If the distance is too large, only very large distances from the focal plane can be estimated. Furthermore, if all of the nearby large micro-lenses are in a line, only disparity in one direction can be seen. As can be appreciated, the spacing and relative positioning of the large depth sensing micro-lenses within the micro-lens array determines the precision of depth sensing over the entire scene.

Figure 8:
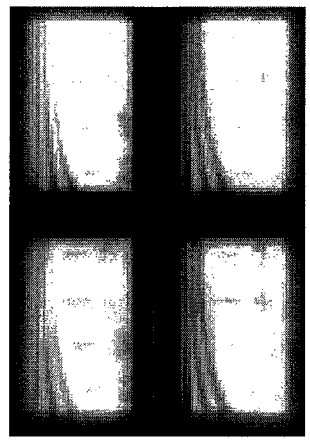
FIGS. 8 & 9 are example images from four quadrant depth sensing pixels without a light mask and with a light mask, respectively, according to some embodiments.
Figure 9:
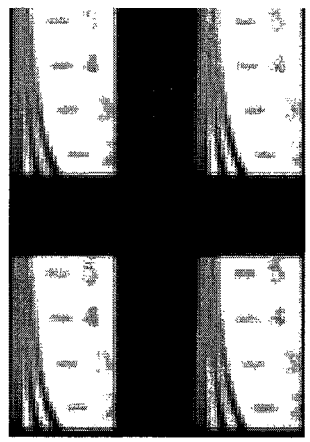

There are four types of depth sensing pixels ($D_1$, $D_2$, $D_3$, $D_4$) based on the position of the pixel relative to the above micro-lens. The effective apertures of these depth sensing pixels approximately correspond to the quadrants of the physical apertures. See further explanation above with reference to FIGS. 2, 3, 4A, 4B and 5. These four types of depth sensing pixels generate four different view images. (A view image is an optical intensity image obtained by collecting optical intensity data from pixels with approximately the same effective aperture.) FIGS. 8 & 9 show simulations of the four view images corresponding to data collected by a plurality of D1, a plurality of D2, a plurality of D3 and a plurality of D4 sensing pixels corresponding to a plurality of large depth sensing micro-lenses uniformly distributed over a micro-lens array (the distribution of depth sensing micro-lenses being as shown in FIGS. 2 & 3, for example). The correspondence problem is solved by considering each small region in one of the view images, then finding the most likely match among all feasible matches using the other view images.

The optical intensity image may be generated by interpolating the traditional pixels. Since the four depth sensing pixels behind each larger micro-lens are surrounded by traditional pixels, the optical intensity image values corresponding to the location of the depth sensing pixels can be interpolated with little error, providing, as discussed above, that each group of four depth sensing pixels is surrounded by traditional pixels. This interpolation is relatively simple and does not require any information from the depth sensing pixels, although there are existing technologies (such as used by Pelican Imaging) that use information from the view images to enhance a reference image such as the optical intensity image. However, such processing methods are generally very complex and require accurate depth estimation everywhere, which is difficult or impossible in practice especially for scene regions with no distinct features. Some embodiments of the processing methods described herein avoid these problems by not requiring information from the relatively sparse depth sensing pixels to generate the optical intensity image.

According to embodiments, sufficient depth sensing pixels are provided throughout the sensor array to generate an entire depth image. This is in contrast to methods which utilize micro-lens arrays with sparsely scattered stereo pixels that can only estimate depth at a few locations. Furthermore, sufficient traditional pixels are provided to estimate a full resolution optical intensity image. This is in contrast to stereo solutions where every pixel is a stereo pixel, for which the image resolution is only half of what can be achieved with some embodiments described herein.

The depth sensing pixels of embodiments described herein provide depth estimation for a wide range of scenes. For example, some embodiments described herein overcome the previously described inability of cameras with only a one dimensional change in viewpoint, or one dimensional baseline, to use the component of any image feature that is parallel to the baseline for depth estimation. By considering each pair of view images, the systems in the present disclosure offer baselines in the horizontal, vertical, and diagonal directions. As a result, the system of depth estimation in the present disclosure is more robust or stable when evaluating regions of scenes with features in any direction, instead of only perpendicular to the baseline.

Figure 7:
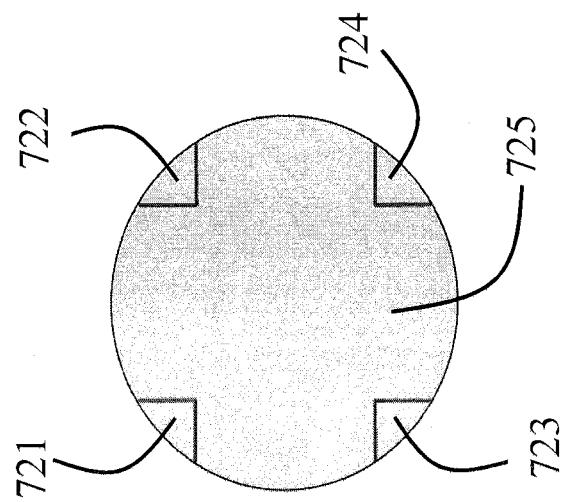
FIG. 7 is a representation of the effective apertures of the depth sensing pixels of FIGS. 6A & 6B.
Figure 6B:
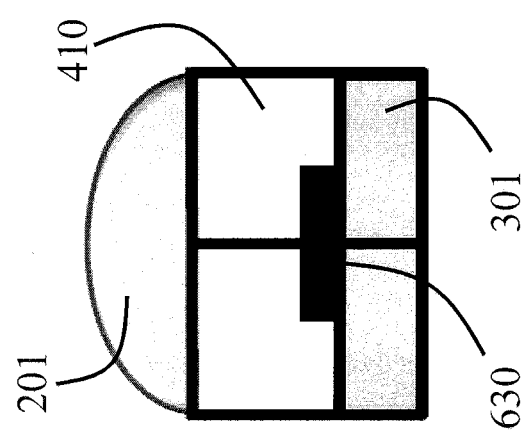
FIGS. 6A & 6B are top view and side view, respectively, of a second embodiment of depth sensing pixels.
Figure 6A:
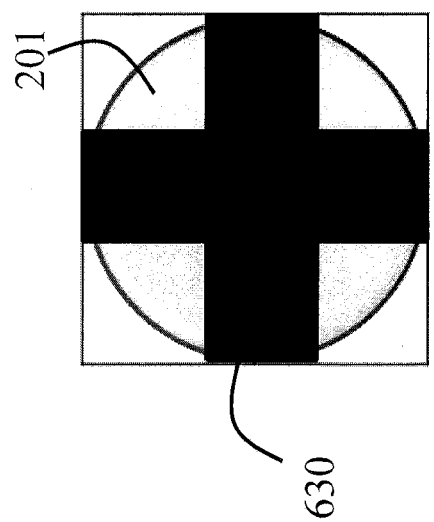

Additionally light masks can be used with depth sensing pixels. In some embodiments these masks block light from the central region of the physical aperture—for example, the center of the large depth sensing micro-lens. Such a light mask 630 is shown in FIGS. 6A & 6B, where a cross-shaped mask is centered on the large depth sensing micro-lens. As a result, the effective apertures for the depth sensing pixels decrease in size and are more distant from each other. For example FIG. 7 is a representation of the effective apertures 721-724 for the four sensing pixels 301 ($D_4$, $D_3$, $D_2$, $D_1$) which correspond to the four quadrants of the depth sensing micro-lens 201 modified by the light mask 630; the area of the aperture occluded by the light mask 630 is represented by the cross-shaped region 725. The same effect may be achieved by modification of a depth sensor such that some areas of the sensor do not measure light, otherwise known as "deadzones". For depth sensing pixels the light mask may be designed to balance the following goals: (1) small area of effective apertures to increase the depth of field of the depth sensing pixels; (2) large distance between the effective areas to increase the disparity by blocking light that comes from the center of the physical aperture; and (3) similar overall sensitivity of all pixels in the sensor to most effectively use the dynamic range of the sensor by having a large signal to noise ratio without saturation. For traditional pixels the light mask may be designed to balance the following goals: (a) effective aperture to achieve the desired depth of field; and (b) similar overall sensitivity of all pixels in the sensor.

Large effective apertures create a shallow depth of field. Therefore, objects away from the focal plane are blurred. Since it is difficult to accurately solve the correspondence problem for blurred objects, the depth range is decreased when blurred images are utilized. This problem may be alleviated in some embodiments with a light mask as shown in FIGS. 6A & 6B, where the light mask 630 increases the depth range by reducing the size of the effective aperture when compared with the same sensor and lens configuration without a light mask—compare FIGS. 8 and 9 which correspond to simulations based on sensors configured as in FIGS. 4A & 4B and FIGS. 6A & 6B, respectively. The simulations for generating FIGS. 8 & 9 assume a camera focused at 150 mm with a flat test chart at an actual distance of 120 mm; it is clear that the light mask reducing the effective apertures increases the depth of field and allows sharper view images to be captured. (Sharper view images make it easier to solve the correspondence problem and thus generate a depth image.) Additionally the light masks increase the baseline between each effective aperture. As previously discussed, the larger baselines increase depth accuracy. The large disparity seen in FIG. 9 (the shift between each view image) is caused by the large baseline; if the effective apertures were the same size but closer together, the disparity would be smaller, but would limit depth accuracy. Note that in FIG. 9 the 4 view images are shifted towards the outside corners of the figure. If one were to compare the position within each view image of FIG. 9 of any fixed point in the scene, it changes its position in the view image. Between adjacent view images in FIG. 9 the shift in position is approximately 30 pixels for this example. In FIG. 8 the shift is much smaller, less than 10 pixels. The overall shift is probably most visible by comparing the size of the black borders compared to the edges of the figure or the blue lines that separate the view images. In FIG. 9 the borders are very different while in FIG. 8 they are almost all the same.

In embodiments it may be desirable to introduce light masks for traditional pixels. These masks would be designed to block light from the annular region on the outside of the physical aperture. As a result, the effective aperture for the traditional pixels would decrease in size. The traditional pixels and the resultant optical intensity image would have an increased depth of field. The increased depth of field means objects at a larger range of depths would appear sharp in the optical intensity image so that more details are observable in the image. The same effect may be achieved by modification of the light intensity sensor in the traditional pixel such that some areas of the sensor do not measure light, otherwise known as "dead-zones".

In traditional cameras the depth of field is controlled by adjusting the physical aperture. In some embodiments of the imaging system, adjusting the physical aperture will impact both the traditional and depth sensing pixels. Since depth estimation is more accurate for large baselines, it is desirable to have a large physical aperture. But increasing the physical aperture results in reduced depth of field, which may be undesirable. The alternative is to introduce light masks for the traditional pixels so that they have a smaller effective aperture and the optical intensity image has a large depth of field. At the same time a large physical aperture can be used resulting in large baselines for the depth sensing pixels and high depth accuracy.

The photodiodes in image sensors are sensitive to a wide range of visible light. The sensor itself is monochromatic so can only generate grayscale images. Almost all imaging sensors place one of three color filters above each pixel in order to adjust what wavelengths of light pass to the underlying sensor, which helps determine the pixel's spectral sensitivity. These color filters are arranged into what is called a color filter array. The most common color filter array is the Bayer color filter array, although other filter arrays may be used. For example, a cyan, magenta, and yellow color filter may be used which allows more light to be measured. Furthermore, some color filter arrays with more than three colors may be used in order to achieve better color accuracy—for example a color filter with red, green, blue, cyan, magenta, and yellow filters—or a color filter with red, green, blue, and white, may be used to achieve better images in dark scenes. Each pixel measures either the red, green, or blue colors of a scene. Since red, green, and blue are desired at each pixel, the two unmeasured colors are estimated using nearby pixel values in a process called demosaicking. If multiple color bands for the optical intensity image are desired, an appropriate color filter array can be placed over the traditional pixels. However, in some embodiments all depth sensing pixels have the same spectral sensitivity.

When all of the depth sensing pixels in a micro-lens array have the same spectral sensitivity the most accurate depth estimation is achieved. The primary reason is that the correspondence problem can be solved accurately using only one color channel, which may in embodiments be a color channel with a broad spectral sensitivity, such that it may be considered to be in effect a "white color" channel. Use of a narrow spectral band (a single color such as one of red, green or blue, for example) is generally not helpful for depth estimation. However, there is an alternative approach where different spectral sensitivities are used for the depth sensing pixels. This can be achieved in two different ways.

First, Color Filter Array (CFA) view images are generated when all pixels behind each large micro-lens have the same spectral sensitivity, but the spectral sensitivities of pixels behind different large depth sensing micro-lenses are different. (For example, a first large depth sensing micro-lens has all red sensing pixels, an adjacent second large depth sensing micro-lens has all green sensing pixels, an adjacent third large depth sensing micro-lens has all blue sensing pixels, etc.) This results in the view images resembling a color filter array. Demosaicking is needed to generate full color view images before solving the correspondence problem and estimating the depth. Unfortunately demosaicking cannot generate high spatial frequencies in the resultant view images, and the lack of high spatial frequencies reduces the depth accuracy.

Second, colored view images are generated when depth sensing pixels in the same position relative to the micro-lens have the same spectral sensitivity, which are different than the spectral sensitivities of pixels at other positions. This results in each view image being a single color but differing between the view images. (For example, for a large depth sensing micro-lens the four sensing pixels may comprise two green sensing pixels, one red sensing pixel and one blue sensing pixel.) The objects in the scene will appear brighter or darker in the different view images based on the color of the objects. However, solving the correspondence problem using view images with different colors is more complex and results in less accurate depth estimates.

Consequently, an approach using depth sensing pixels all with the same spectral sensitivity may be beneficially utilized. Larger spectral sensitivities, when compared with the two alternatives considered above, mean that each depth sensing pixel can gather more light. Since photon shot noise is typically the largest source of noise in modern image sensors, increasing the amount of light collected significantly improves the signal to noise ratio. Image sensors have a limited dynamic range because each pixel has a limit on the amount of light it can accurately measure before reaching saturation. In order to achieve good signal to noise ratio while avoiding saturation, all pixels ideally would capture approximately the same amount of light. It is important to keep a high signal to noise ratio because noise severely downgrades the quality of the optical intensity image and the accuracy of the depth image. In embodiments, all depth sensing pixels have larger spectral sensitivities than traditional pixels—this may be pixels with a broad spectral sensitivity that would be analogous to a white pixel.

Ignoring the effects of any color filter array, less light may fall on depth sensing pixels than traditional pixels due to the geometry of the large depth sensing micro-lenses and sensors or the presence of any light masks. The color filter array in the proposed design may be configured to counteract this loss of light at depth sensing pixels by reducing the light at traditional pixels so that all pixels measure approximately equal amounts of light, which increases the signal to noise ratio while avoiding saturation, although this objective may be achieved solely by the depth sensing pixels having larger spectral sensitivities.

The processing of the light intensity data from the traditional pixels and from the depth sensing pixels is described with reference to FIGS. 10-13.

Figure 10:
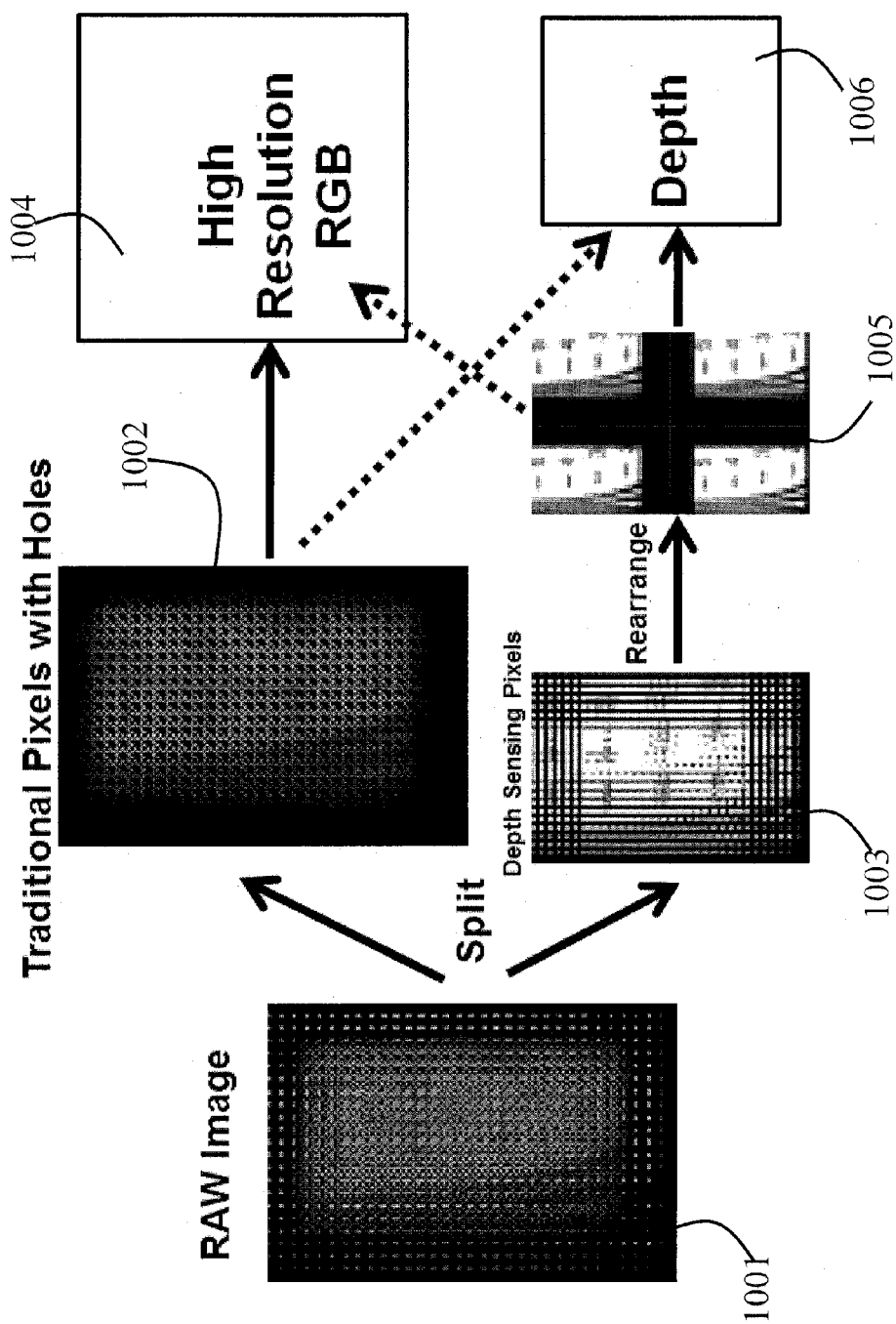
FIG. 10 is a representation of an imaging process including depth estimation, according to some embodiments.

An illustration of image processing utilizing representative images is shown in FIG. 10. A raw image 1001 is collected by the entire sensing array, such as the array described above with reference to FIG. 3, including data from traditional sensing pixels and from depth sensing pixels. The raw data is divided to produce two separate images—a raw image 1002 due to the traditional sensing pixels only (holes—no data, or data with value zero—in the image existing where depth sensing pixels are located), and a raw image 1003 due to the depth sensing pixels only. The separation may be performed by digital processing, which may be implemented in a general computer processor or a specialized processing chip. Alternatively, the separation might not be explicitly performed if the final outputs (high resolution RGB and depth images) are directly estimated from the appropriate pixels in the raw image. In such an implementation, FIG. 10 is more of a description of the underlying process instead of a description of the implementation. The raw image 1002 is processed to generate a high resolution RGB image 1004; the processing comprises interpolation to cover the "gaps" in the image due to the depth sensing pixels. The raw image 1003 is rearranged to provide four images 1005—corresponding to the four types of depth sensing pixels $D_1$, $D_2$, $D_3$, and $D_4$, as described above. The correspondence problem is solved as described above for the four images 1005 to generate a depth image 1006. A more detailed example of the generation of a depth image 1006 is as follows. One of the four images 1005 is chosen as a reference image. For each pixel in the reference image each possible depth value is used to identify feasible matches in the other 3 images 1005. (Note that here is only one corresponding point in each of the images 1005 that will correspond with the same point in space that would appear at the desired depth and the chosen point in the reference image.) The similarity of each of the small regions surrounding the identified feasible matches in the four images 1005 is evaluated. The depth value that results in the most similarity is chosen as the most likely depth value. The depth image 1006 is obtained by performing a similar operation for each pixel in the reference image.

In some embodiments, the raw image data 1002 may be used to enhance the depth image 1006, as indicated by the dashed line in the figure. For example, the high frequency information (such as edges) may be used to increase the resolution of the depth image. Basically the depth image is increased in size by using nearby depth values while being careful not to spread depth estimates across edges which may represent object edges where occlusions occur. See examples of image enhancement processes in the reference: Image Guided Depth Upsampling using Anisotropic Total Generalized Variation, David Ferstl, Christian Reinbacher, Rene Ranftl, Matthias Ruether, and Horst Bischof in Proceedings International Conference on Computer Vision (ICCV), IEEE 2013, all incorporated by reference in their entirety herein. In a further example, the traditional pixels or high resolution RGB image may be used as a reference image for depth estimation—the idea is to use this image as a central view image and determine depth by comparing the disparities between this central view image and the four corner view images from the depth sensing pixels.

In some embodiments, the rearranged depth sensing data may be used to enhance the high resolution RGB image 1004, as indicated by the dashed line in the figure and described in more detail below. In some embodiments, the high resolution RGB image 1004 and the depth image 1006 may be further manipulated to generate three dimensional images, projections, etc. For example, using the depth image, the RGB image can be manipulated to generate novel views of the scene from new points in space that are different than the camera's position. These novel views enable 3D visualization of the scene and visually display the scene's 3D structure. The depth image is needed to accurately generate these views, which otherwise could not be generated. Furthermore, another possibility is to digitally adjust the focus of the RGB image. For example, a shallow depth of field can be simulated by blurring objects in the scene based on their depth. This can be used to direct the attention of the viewer to particular regions of the scene. Yet furthermore, the RGB image can be segmented automatically or interactively using the depth image as a guide. Segmentation without depth is very challenging because of the difficulty of understanding which pixels belong to a particular object, whereas using a depth image, it is simple to segment objects based on depth discontinuities.

Note that the average of measurements of pixels behind a large micro-lens can also be used for interpolation of the optical intensity image. Averaging the pixels behind the large micro-lens gives an equivalent measurement to a single pixel with the same area as the four original pixels with an effective aperture equal to the union of the effective apertures of the four original pixels. The resultant value gives information related to the region of the scene that should appear in the optical intensity image in the place of the corresponding depth sensing pixels.

It is expected that optimal linear operators may be used to interpolate the optical intensity image. For example, see US Publication No. 2012/0307116 A1, incorporated by reference in its entirety herein. Optimal filters for a series of depth values may be learnt. Locally the filter that is chosen would match the filter that was optimized for the estimated depth value.

Since the depth sensing pixels have different effective apertures than the traditional pixels, some disparity may exist between the position of the depth sensing pixel location and the corresponding location of the viewed object in the optical intensity image. This disparity will depend on depth. For example, objects that are very far away will exhibit no disparity and the depth sensing pixels can be used in the interpolation in a similar way to the traditional pixels. For closer objects, some disparity will exist and the interpolation algorithm should consider the measurements from the depth sensing pixels to have occurred at the adjusted position before performing interpolation. Since such an interpolation would need to take into account spatial and spectral correlations within images and depend on depth, the processing would be complex. In some embodiments methods include automatic learning of optimal interpolation filters based on depth such as through computer simulation.

FIGS. 11-13 are schematic diagrams showing some embodiments of the image processing system of the invention, broken down into functional blocks. In FIG. 11 an image sensing unit 1101 collects light intensity data, where the image sensing unit comprises both traditional pixels and depth sensing pixels, as described above. The collected data is separated into (1) measurements of traditional pixels behind the smaller micro-lenses, and (2) measurements of depth sensing pixels behind the larger depth sensing micro-lenses, and is delivered to an optical intensity processing unit 1102, and a depth processing unit 1103, respectively. These processing units process the data as described above to generate an optical intensity image and a depth image. These images are then delivered to an optical intensity image storage unit 1104 and a depth image storage unit 1105. In some embodiments the intensity processing unit and the depth processing unit may be within a single computer processor. Furthermore, in some embodiments the optical intensity image storage unit and the depth image storage unit may be a single storage unit, such as a computer memory device.

In FIG. 12, the system of FIG. 11 is modified with the addition of an averaging unit 1206 which receives the measurements of pixels behind the larger depth sensing micro-lenses, processes the data as described above and then delivers the data to optical intensity processing unit 1202 which uses the averaged data to enhance the optical intensity image, as described above.

In FIG. 13, the system of FIG. 11 is modified such that the optical intensity processing unit 1302 delivers optical intensity image data to the depth processing unit 1303 which uses the intensity image data to enhance the depth image, such as discussed above.

Figure 14:
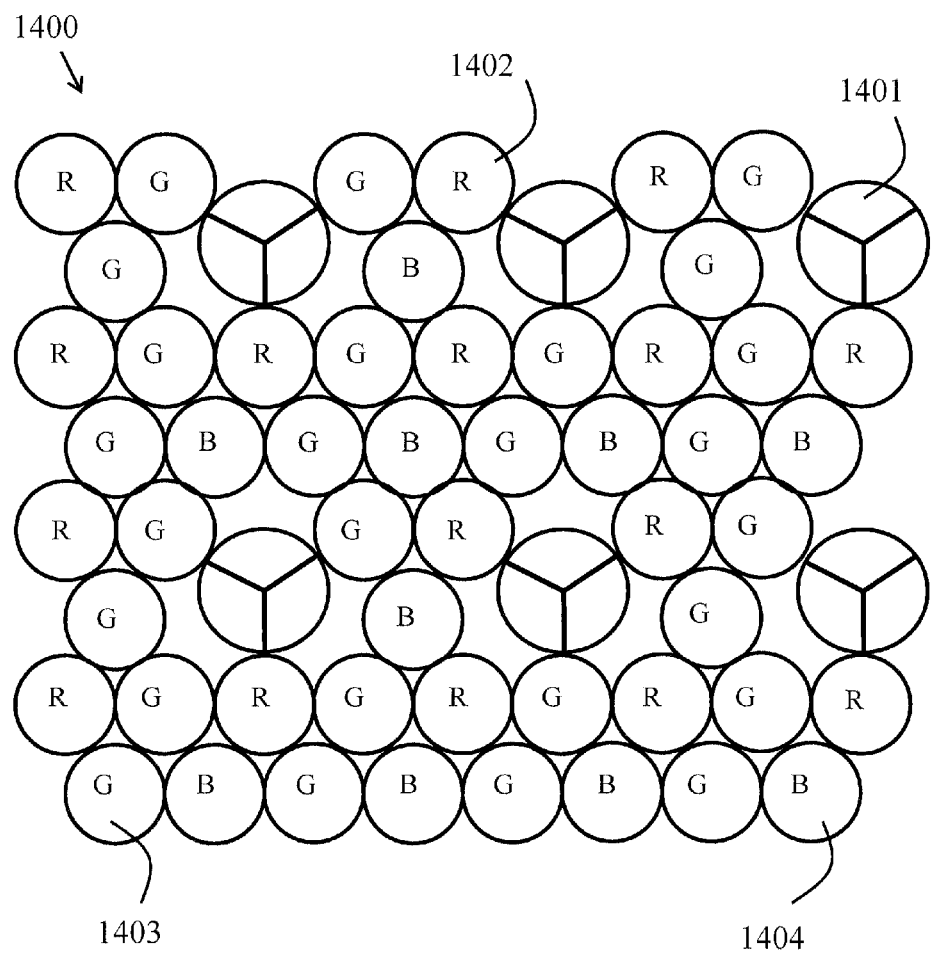
FIG. 14 is a schematic plan view of a detail of an array of micro-lenses comprising both traditional and depth sensing micro-lenses where the array is based on an HCP configuration with three depth sensing pixels per depth sensing micro-lens, according to some embodiments.
Figure 15:
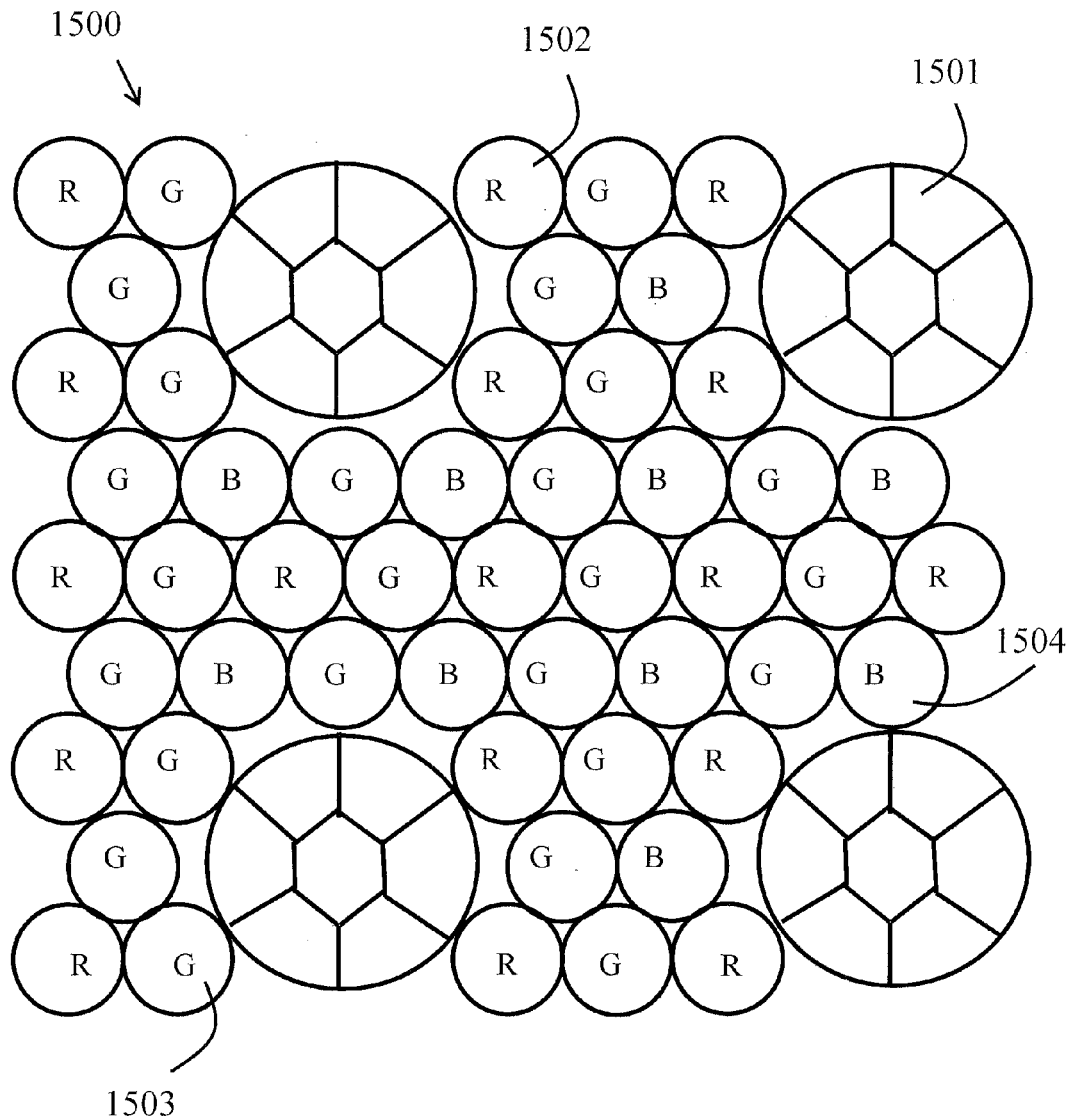
FIG. 15 is a schematic plan view of a detail of an array of micro-lenses comprising both traditional and depth sensing micro-lenses where the array is based on an HCP configuration with seven depth sensing pixels per depth sensing micro-lens, according to some embodiments.

Although embodiments of the present disclosure have been particularly described with reference to rectilinear arrays of micro-lenses and corresponding rectilinear arrays of sensing pixels, the teaching and principles of the present disclosure may also be applied to other configurations of micro-lenses and sensing pixels, such as hexagonal close packed (HCP) planar configurations, etc. Furthermore, the micro-lenses and sensing pixels may be configured in planes that are flat or curved. Yet furthermore, in embodiments pixels and their associated micro-lenses may have different sizes. For example, larger pixels can collect light over a larger area and will have a better signal to noise ratio than a smaller pixel paired with the same micro-lens. Another example is to have smaller pixels behind the larger micro-lenses to increase the sampling density of the depth sensing pixels; if these smaller pixels are arranged in a rectangular grid, this would result in some rows/columns being bigger than others. Furthermore, the different sized pixels could be placed in other arrangements such as variations of hexagonal close packing (HCP). For example, FIG. 14 shows an array of micro-lenses 1400 comprising larger depth sensing micro-lenses 1401 and traditional micro-lenses 1402-1404, the latter being labeled with R, G and B, respectively, to indicate the color that is detected by the sensing pixel associated with each micro-lens; FIG. 15 shows an array of micro-lenses 1500 comprising larger depth sensing micro-lenses 1501 and traditional micro-lenses 1502-1504, the latter being labeled with R, G and B, respectively, to indicate the color that is detected by the sensing pixel associated with each micro-lens. In FIG. 14 the depth sensing micro-lenses 1401 are shown to be divided into 3 sectors corresponding to 3 depth sensing pixels per depth sensing micro-lens in a corresponding HCP array of sensing pixels (in which there is one sensing pixel per traditional micro-lens). In FIG. 15 the depth sensing micro-lenses 1501 are shown to be divided into 7 regions corresponding to 7 depth sensing pixels per depth sensing micro-lens in a corresponding HCP array of sensing pixels (in which there is one sensing pixel per traditional micro-lens). In FIGS. 2, 14 and 15 there are two orthogonal directions in the plane of the array along which the depth sensing micro-lenses are seen to be arranged. However, in embodiments the directions may be non-orthogonal, for example the directions may be at an angle in the range of 45 to 60 degrees to each other, depending on, among other factors, the array configuration and lens shapes; there may also be more than two directions in the plane of the array that can be used to define the configuration of the array.

Although embodiments of the present disclosure have been particularly described with reference to red, green and blue sensing pixels, due to the use of a color filter, for example, the teaching and principles of the present disclosure may also be applied to other types of sensing pixels, such as sensing pixels with different color filters, such as cyan, yellow and magenta. Furthermore, sensing pixels with specific wavelength range sensitivities, without the need for a color filter, may also be used. Yet furthermore, in some embodiments sensing pixels may be selected to collect image data in non-visible parts of the electromagnetic spectrum, including ultraviolet and infrared, for example. Furthermore, in embodiments sensing pixels may be used which measure certain light polarizations.

Although embodiments of the present disclosure have been particularly described with reference to cameras, the teaching and principles of the present disclosure may also be applied to endoscopes. Furthermore, it should be readily apparent to those of ordinary skill in the art that changes and modifications in the form and details of the present disclosure may be made to adapt the apparatus and methods described herein for use with microscopes. For example, with the depth and intensity images, it is possible to make measurements of physical dimensions of objects viewed by the microscope. Because of the short distances involved in microscopy, it is very difficult to achieve a large depth of field (meaning everything is blurry except close to the focal plane). Some embodiments of the present disclosure can assist in extending the depth of field and avoiding diffraction caused by the outside edges of the aperture. Being able to generate novel views from new perspectives is very important since without this technology it is difficult to visualize and understand the three dimensional (3D) geometry as seen through a microscope because of the limited depth of field and the general lack of geometric intuition for microscopic objects (for most photography scenes, one can understand 3D geometry often based on the scene content—for example one appreciates the typical height of humans and therefore understands their relative distances). Yet furthermore, some embodiments of the present disclosure can be used in optical measurement devices to understand physical distances (such as simple length/area measurements) or 3D scene understanding for maps or virtual environments, or scanning of 3D objects.

Although embodiments of the present disclosure have been particularly described with reference to certain embodiments thereof, it should be readily apparent to those of ordinary skill in the art that changes and modifications in the form and details may be made without departing from the spirit and scope of the disclosure.

What is claimed is:

1. An apparatus for acquiring intensity and depth information images comprising:
    an image sensing unit having first radiation-sensitive elements and groups of second radiation-sensitive elements in a flat or curved plane having at least two directions, the first radiation-sensitive elements and groups of second radiation-sensitive elements to receive, respectively, an intensity image and a depth information image, at least two groups of second elements extending in each of the two directions of the plane;
    first micro-lenses having a pitch approximately equal to that of the first elements, each of the first micro-lenses is arranged to convey radiation to a corresponding one of the first elements, and
    second micro-lenses, each of which is arranged to convey radiation to a corresponding group of the second elements, each combination of second micro-lens and corresponding group of the second elements having at least one of a light mask and a dead-zone in the group of the second elements to reduce the effective aperture of the second micro-lens.

2. The apparatus according to claim 1, wherein said at least two directions are two orthogonal directions.

3. The apparatus according to claim 2,
    wherein at least one of the first elements is between the at least two groups of second elements extending in each of the two perpendicular directions of the plane.

4. The apparatus according to claim 1,
wherein each of the first plurality of micro-lenses is smaller than each of the second plurality of micro-lenses.

5. The apparatus according to claim 1, wherein each of the groups of second elements is surrounded by first elements and a ratio of groups to first elements is in the range of 1/6 to 1/100.

6. The apparatus according to claim 4, wherein the ratio is approximately 1/32.

7. The apparatus according to claim 1, wherein each of the second micro-lenses is surrounded by first micro-lenses and the ratio of second micro-lenses to first micro-lenses is in the range of 1/6 to 1/100.

8. The apparatus according to claim 7, wherein the ratio is approximately 1/32.

9. The apparatus according to claim 1, further comprising, one or more processing units configured to (i) load first pixel signals from the first elements to create a representation of the intensity image and (ii) load second pixel signals from the second elements to create a representation of the depth information image.

10. The apparatus according to claim 9, wherein the one or more processing units are further configured to generate one of (i) first values corresponding to the second elements to create the representation of the intensity image and (ii) second values corresponding to the first elements to create the representation of the depth information image.

11. The apparatus according to claim 10, wherein the one or more processing units calculates an average of the second pixel signals and creates the representation of the intensity image using the average, the first pixel signals, and the first values.

12. The apparatus according to claim 10, wherein the one or more processing units are further configured to create the depth information image using the second pixel signals, the second values, and the first pixel signals.

13. The apparatus according to claim 10, wherein the one or more processing units are further configured to calculate a third value based on one or more of (i) calculating an average of second pixel signals from a group of second elements, (ii) calculating an interpolation filter based on depth using automatic learning by computer simulation, and (iii) a guided filter, and using the third value to create the representation of the intensity image.

14. The apparatus according to claim 1, further comprising, a mask to block radiation between one of the second micro-lenses and a corresponding one of the groups of second elements.

15. The apparatus according to claim 1, further comprising, a dead zone in the corresponding plurality of elements of the second plurality of elements.

16. The apparatus according to claim 1, wherein the second radiation sensitive elements do not include color filters, the second radiation sensitive elements each having approximately equal spectral sensitivities.

17. The apparatus according to claim 16, wherein each element of the first radiation sensitive elements includes a filter for one of a multiplicity of colors.

18. The apparatus according to claim 1, wherein each element of the first radiation sensitive elements includes a mask to reduce the size of the effective aperture of each element.

19. The apparatus according to claim 1, wherein said at least two directions are at an angle in the range of 45 to 60 degrees to each other.

20. A method of simultaneously generating a depth image and a light intensity image, comprising:
collecting light intensity data from an image sensing unit, the image sensing unit having:
first radiation-sensitive elements and groups of second radiation-sensitive elements in a flat or curved plane having at least two directions, the first radiation-sensitive elements and groups of second radiation-sensitive elements to receive, respectively, an intensity image and a depth information image, at least two groups of second elements extending in each of the two directions of the plane;
first micro-lenses having a pitch approximately equal to that of the first elements, each of the first micro-lenses is arranged to convey radiation to a corresponding one of the first elements; and
second micro-lenses, each of which is arranged to convey radiation to a corresponding group of the second elements, each combination of second micro-lens and corresponding group of the second elements having at least one of a light mask and a dead-zone in the group of the second elements to reduce the effective aperture of the second micro-lens;
processing using a computer processor the light intensity from the first radiation-sensitive elements to generate a light intensity image;
processing using the computer processor the light intensity from the second radiation-sensitive elements to generate a depth image; and
storing in a memory device the light intensity image and the depth image.

21. The method according to claim 20, further comprising generating using the computer processor a new image from the light intensity image and the depth image.

22. The method according to claim 20, wherein said at least two directions are two orthogonal directions.

* * * * *